US005504661A

United States Patent [19]

Szpak

[11] Patent Number: 5,504,661
[45] Date of Patent: Apr. 2, 1996

[54] TRANSLUCENT FLUORESCENT FILTER FOR DISPLAY PANELS

[75] Inventor: Archana Szpak, Canton, Mich.

[73] Assignee: Ford Motor Company, Dearborn, Mich.

[21] Appl. No.: 270,563

[22] Filed: Jul. 5, 1994

[51] Int. Cl.$^6$ .................................................. G01D 11/28
[52] U.S. Cl. ............................ 362/30; 362/84; 362/260;
362/293; 340/815.47; 340/815.56; 340/815.75;
340/815.76
[58] Field of Search ................ 40/542–544; 340/815.47,
340/815.54, 815.55, 815.56, 815.57, 815.65,
815.75, 815.76; 345/32, 36, 45, 47, 102,
151; 359/50; 362/23, 29, 30, 84, 260, 293

[56] References Cited

U.S. PATENT DOCUMENTS

| | | | |
|---|---|---|---|
| 2,594,903 | 4/1952 | Freedman et al. | 40/543 |
| 3,652,956 | 3/1972 | Pinnow et al. | 332/7.51 |
| 4,035,686 | 7/1977 | Fleming | 363/84 |
| 4,761,715 | 8/1988 | Brooks | 362/23 |
| 4,779,166 | 10/1988 | Tanaka et al. | 362/84 |
| 4,874,224 | 10/1989 | Gutman et al. | 350/174 |
| 4,989,956 | 2/1991 | Wu et al. | 359/50 |
| 4,991,064 | 2/1991 | Clem | 362/27 |
| 5,117,334 | 5/1992 | Kameda | 362/293 |
| 5,128,846 | 7/1992 | Mills et al. | 362/260 |
| 5,130,548 | 7/1992 | Sano | 250/461.1 |
| 5,131,877 | 7/1992 | Mathumoto | 445/24 |
| 5,142,274 | 8/1992 | Murphy et al. | 340/705 |
| 5,162,160 | 11/1992 | Matsui et al. | 428/690 |
| 5,223,814 | 6/1993 | Suman | 340/525 |
| 5,227,773 | 7/1993 | Wu et al. | 340/815.56 |
| 5,232,388 | 8/1993 | Danjell | 445/22 |
| 5,257,167 | 10/1993 | Clem | 362/27 |

FOREIGN PATENT DOCUMENTS

| | | | |
|---|---|---|---|
| 52-20796 | 2/1977 | Japan | 345/102 |

OTHER PUBLICATIONS

Shift, The Journal of Automative Innovation, Issue 1, 1994, Chris Shol, Go–Anywhere Lighting, pp. 20–21.
Encyclopedia of Electronics and Computers, Light Panel, Sybil P. Parker, pp. 459–460, 1982.

Primary Examiner—Denise L. Gromada
Assistant Examiner—Alan B. Cariaso
Attorney, Agent, or Firm—Mark L. Mollon; Roger L. May

[57] ABSTRACT

In a display apparatus using projected illumination for display elements, a translucent fluorescent filter is disposed between the light source and the display element. The filter modifies the visible spectrum of light illuminating the display element. A single light source can be used to achieve a color that is not present or is very low in the original source without added complexity in a control panel. Acceptable luminance levels are achieved in multi-colored control panels with a single light source.

15 Claims, 5 Drawing Sheets

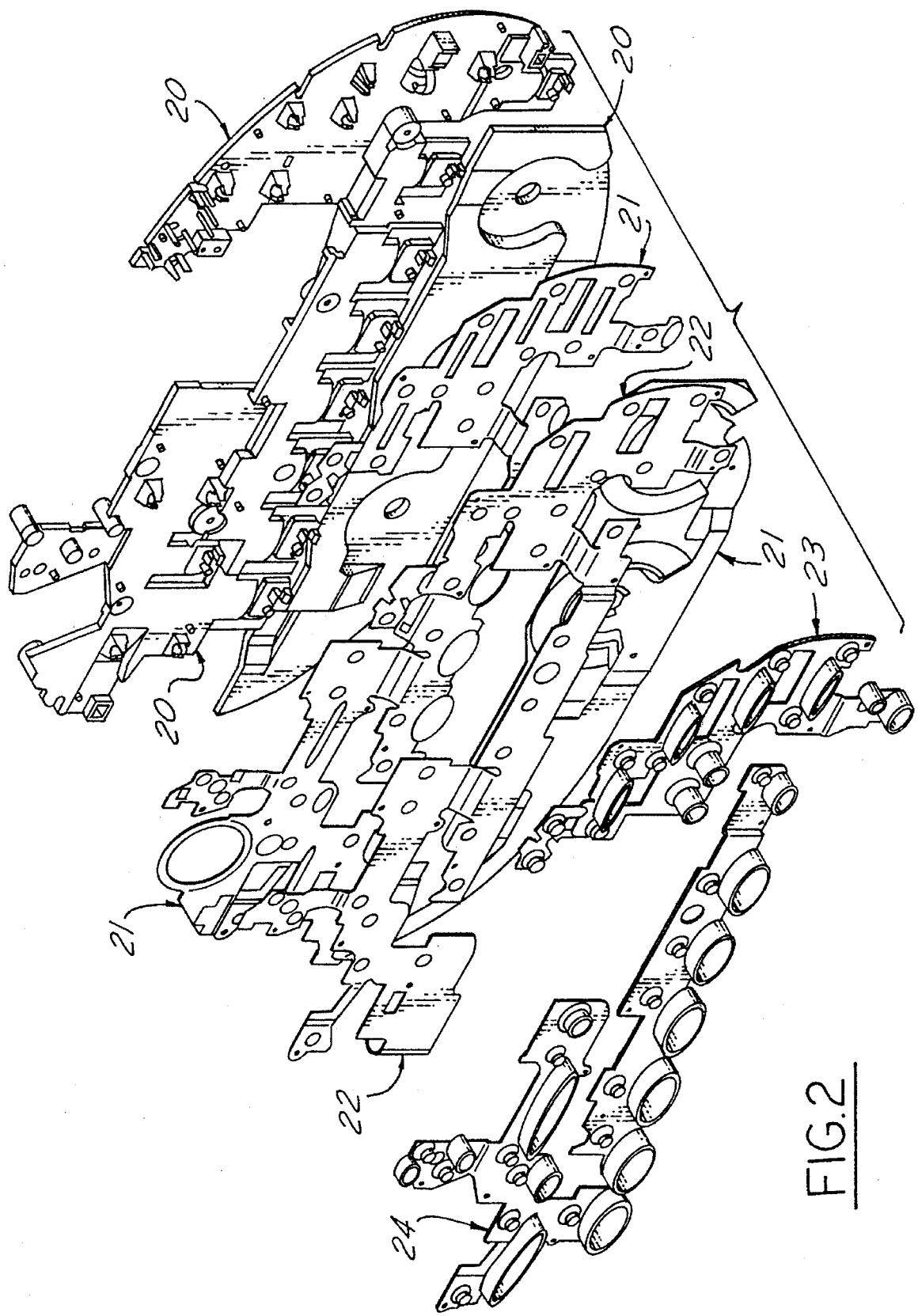

TRANSLUCENT FLUORESCENT FILTER FOR DISPLAY PANELS

BACKGROUND OF THE INVENTION

This application is related to copending application Ser. No. (08/270,331) filed concurrently with this application which is incorporated herein by reference.

The present invention relates in general to illuminating graphic symbols on display panels, and more specifically to the use of fluorescent pigments to modify color spectrum of illuminated graphics on a portion of a display.

Backlit control panels are used in various devices such as automobile instrument panels, instrument clusters, audio systems, and door switch pads. Backlit graphics on these control panels are typically adjacent or contained on control buttons or dials, such that the graphic indicates the function performed by the buttons or dials. A typical control panel includes a front cover or bezel having translucent graphics contained within an opaque background, a light source behind the bezel, and a light distribution network behind the bezel.

In addition to backlighting, certain displays, such as instrumentation gauges in automobiles, use front projection lighting of symbols or indicators. Light from a light source is usually redirected from behind or from the side of the display toward the front surface of the illuminated graphic.

In both backlit or projection-lit displays, a colored graphic display is achieved by coloring the graphic itself or illuminating it with colored light. For example, many automotive audio systems use white transparent graphics on a black background for most of the bezel graphics together with some number of specially colored transparent graphics to highlight corresponding control functions. The white color facilitates daytime viewing. Under non-daylight conditions, the white graphics are backlit with colored light for a more pleasing appearance.

One possible light source for a backlit control panel is an electroluminescent (EL) lamp panel. An EL panel typically comprises a micro-encapsulated phosphor contained between two conductive plates. One plate is transparent to pass light generated when the plates are charged. EL has advantages of small size (it is very thin) and an ability to selectively backlit desired areas of control panels without complicated light baffles or light pipes. One limitation of EL is that its luminance level or brightness tends to be lower than that achievable with other sources unless high voltage levels or frequencies are applied. Furthermore, the brightness achievable at a particular voltage and frequency depends on the color of light produced. Phosphors formulated for producing blue light have achieved higher brightness than for other colors (especially red) or blends of colors. Thus, brightness from an EL lamp panel has been approximately directly proportional to the frequency of light produced.

Although brightness can be generally increased by applying a higher voltage or a higher frequency to the EL lamp panel, voltage is limited in automotive systems without expensive converters. Higher voltages also create more stress in the phosphor layer, reducing the lifetime and durability of the EL lamp. In addition, higher frequencies are undesirable because of increased electromagnetic radiation. These factors have caused problems in creating multi-colored EL displays.

Another choice for a light source to be used in backlighting is the incandescent bulb. In order to distribute light to the back side of the desired graphics, a light pipe typically having the form of a flat sheet with predetermined reflective surfaces is employed between the incandescent lamp and the bezel.

Since incandescent bulbs produce substantially white light, filtering is used to provide colored light. Control panels with multi-colored incandescent backlighting have been complex due to the need for either colored bulbs or numerous filters. As previously mentioned, a typical control panel utilizes white translucent graphics for good daytime visibility together with some number of specially colored translucent graphics to highlight certain functions. For example, red indicates hot and blue indicates cold for adjustment dials in a climate control panel for an automobile. In order to reduce complexity of a control panel, a colored filter for producing the colored light of most of the graphics (e.g., a green light for backlighting the white translucent graphics) is combined in a single structure with the light pipe for distributing all the light. The same color filtering light pipe directs light (e.g., now colored green) toward the specially colored (e.g., red and blue) graphics for nighttime illumination. However, depending on the colors involved, the specially colored graphics may receive inadequate illumination brightness since there may be little light brightness left at the special color (e.g., red) after the initial filtering (e.g., green).

SUMMARY OF THE INVENTION

The present invention has the advantage that a single light source can be used to achieve a color that is not present or is very low in the original source without added complexity in the backlit control panel.

The present invention has the further advantage of achieving acceptable luminance levels in multi-colored control panels.

These and other advantages and objects are achieved in a display apparatus wherein a display element shines by projected illumination. A light source directs illumination toward the display element. A translucent fluorescent filter is disposed between the light source and the display element. The filter modifies the visible spectrum of light illuminating the display element.

In another aspect of the invention, an automotive illumination apparatus comprises a backlit display panel having first and second translucent graphics. The first translucent graphic is displayed with a first pre-determined color. The second translucent graphic is displayed with the second pre-determined color corresponding to a higher frequency than the first pre-determined color. A light source backlighting the backlit display panel and directing illumination toward the first translucent graphic and the second translucent graphic has a luminance at the first predetermined color less than the desired total luminance of the first predetermined graphic. A layer of fluorescent material disposed between the light source and the first translucent graphic is characterized by light absorption at the second predetermined color and light re-emission including the first predetermined color.

Thus, the invention is useful and advantageous in displays using projected light to illuminate display elements. Fluorescent filtering increases the brightness at a desired color above the original brightness in the projected light source.

BRIEF DESCRIPTION OF THE DRAWINGS

FIG. 2 is an exploded perspective view of the control panel in FIG. 1.

DETAILED DESCRIPTION OF PREFERRED EMBODIMENTS

Figure 1:
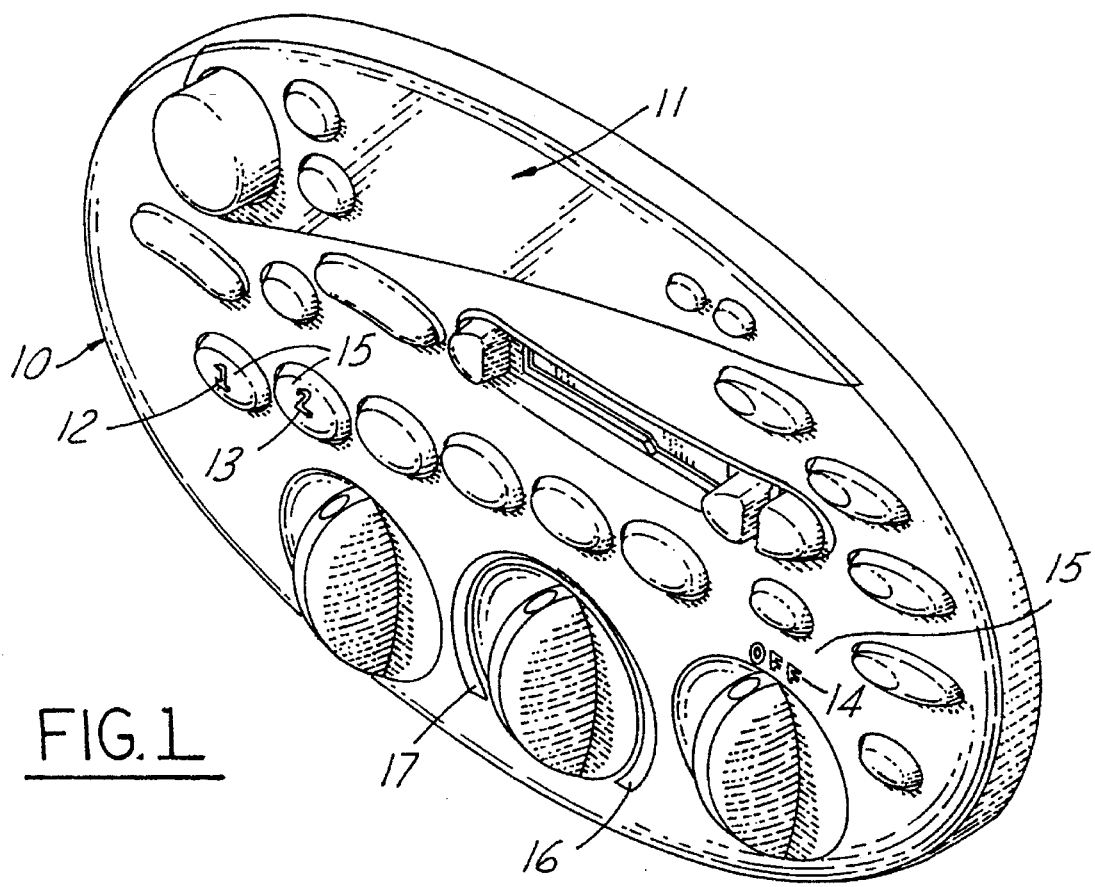
FIG. 1 is a perspective view of a control panel according to the present invention.

Referring to FIG. 1, an automotive control panel 10 includes both audio entertainment (e.g., radio and cassette tape) functions and climate control functions. A plurality of buttons, dials, and rocker switches control operation of audio and climate control systems. A character display 11 provides system information to the user.

Graphic display elements are associated with the buttons, dials, knobs and switches of control panel 10 to assist the user in controlling the various functions. Only a few graphics are shown in FIG. 1 such as graphic elements 12 and 13 contained on respective control pushbuttons and display element 14 contained on the surface of control panel 10. Regions 15 surrounding display elements 12–14 are opaque and provide a contrasting color.

Display elements 12, 13, and 14 are preferably light or white in color to facilitate daytime viewing while surrounding regions 15 are preferably black. The majority of display elements associated with the various control functions are light in color. However, certain graphics may be highlighted by differentiating with a different color, e.g., hot and cold temperature indicators 16 and 17 on the face of control panel 10.

Display elements 12–14, 16, and 17 are backlit during nighttime operation. Thus, each graphic is translucent in order to pass through illumination from the rear side of control panel 10.

FIG. 2 shows elements contained behind control panel 10 associated with illumination and control functions. A rigid backplate 20 mountingly receives an electroluminescent lamp panel 21. A flexible circuit layer 22 is mounted over EL panel 21. Switchmats 23 and 24 are mounted over flex circuit 22 and receive hard button covers of the control panel (not shown). Backplate 20 includes electrical circuit traces (not shown) that are aligned with contacts (not shown) on switchmats 23 and 24 to generate electrical signals when the pushbuttons are activated.

Figure 3:
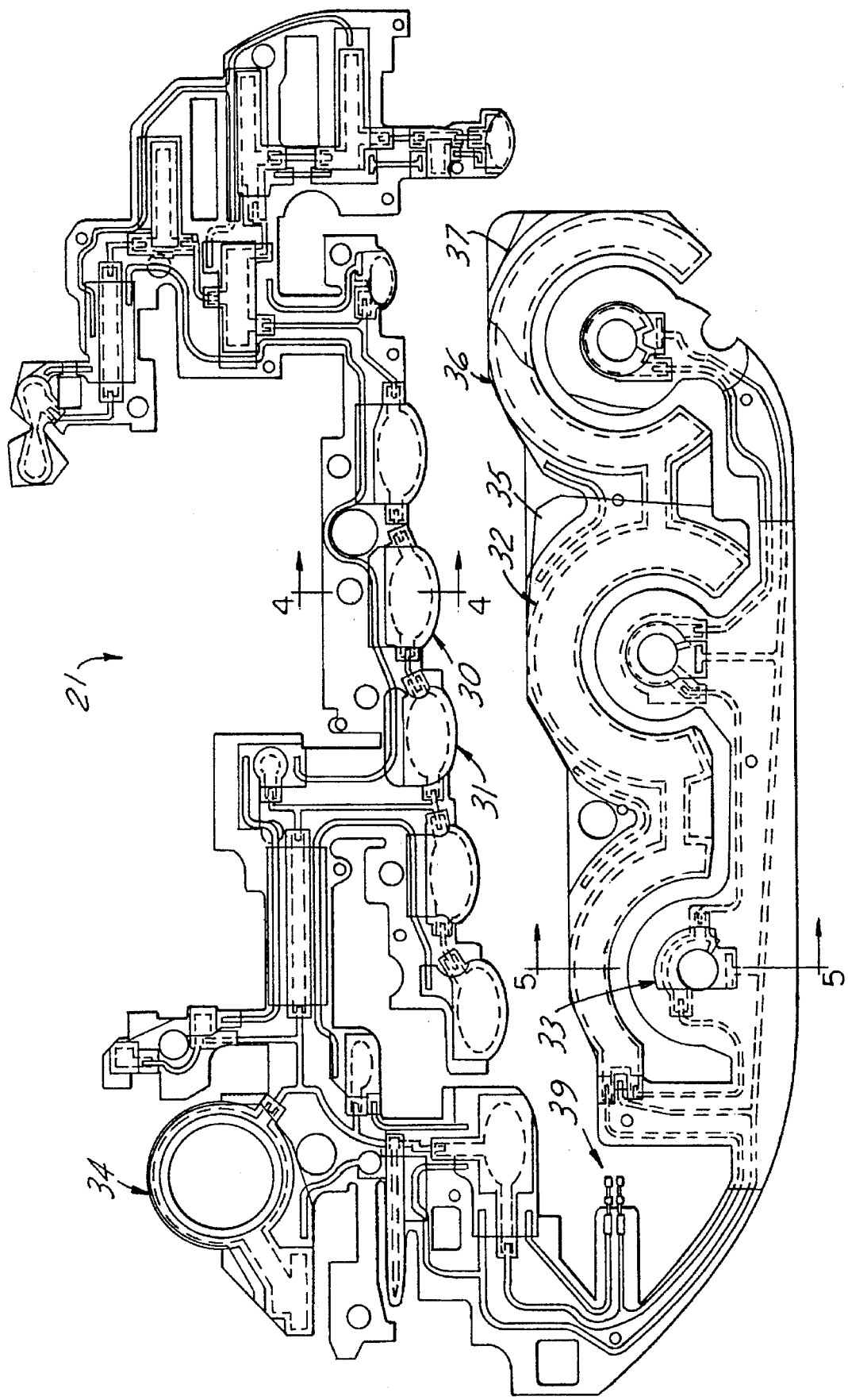
FIG. 3 is a front plan view of an electroluminescent lamp panel shown in FIG. 2.

EL lamp panel 21 is shown in greater detail in FIG. 3. Panel 21 has an irregular shape and includes a substrate supporting conductive plates, a phosphor layer, and interconnecting traces. A plurality of electroluminescent areas are distributed across the lamp panel, for example, areas 30 and 31 for directing illumination through corresponding control buttons, areas 32 and 33 for illuminating graphics on the bezel adjacent to corresponding control dials, and area 34 disposed around a rotary adjustment knob. A pair of connector pins 39 are connected to an appropriate AC power source to produce electroluminescent lighting.

According to the present invention, a translucent fluorescent filter covers electroluminescent areas 32 and 33 for modifying the visible spectrum of light produced by electroluminescence. Thus, a fluorescent coating 35 is disposed on the front surface of lamp panel 21. Likewise, a portion of an electroluminescent area 36 shaped as an arc is covered by a fluorescent filter area 37. In this example, a blue-green light spectrum is provided by electroluminesence. The uncoated half of area 36 provides blue-green light for backlighting the blue temperature graphic. Fluorescent filter area 37 converts blue-green light to a red-orange spectrum to backlight the red temperature graphic.

Figure 4:
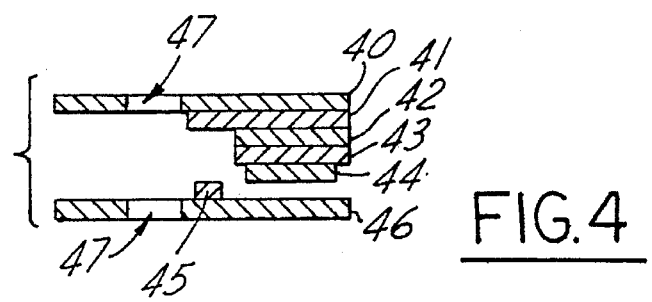
FIG. 4 is a cross-sectional view of the EL lamp panel along lines 4—4 of FIG. 3.

The structure of the present invention will be better understood referring to the partially exploded cross-sectional view of FIG. 4 along lines 4—4 of FIG. 3. The fluorescent filter of this invention can be used together with any EL lamp such as those sold by Durel Corp. A clear substrate layer 40 supports the entire lamp. Substrate 40 may be comprised of polyester, for example. A transparent conductor 41 is contained on one surface of substrate 40, and may comprise indium-tin-oxide (ITO) material. An electroluminescent phosphor layer 42 is deposited on the transparent conductor. Any conventional electroluminescent phosphor mixture may be employed, such as one for producing blue-green light. A dielectric layer 43 is deposited on phosphor layer 42 and supports a carbon electrode layer 44. A silver trace 45 is in contact with the transparent electrode layer 41. Finally, a hardcoat layer 46 is deposited over the other layers to provide mechanical protection and electrical insulation. A material such as one which is curable using ultraviolet radiation may be employed. A hole 47 through lamp panel 21 provides a mounting hole and/or a passage for switch contacts between the switchmat and the electrical circuit board.

Figure 5:
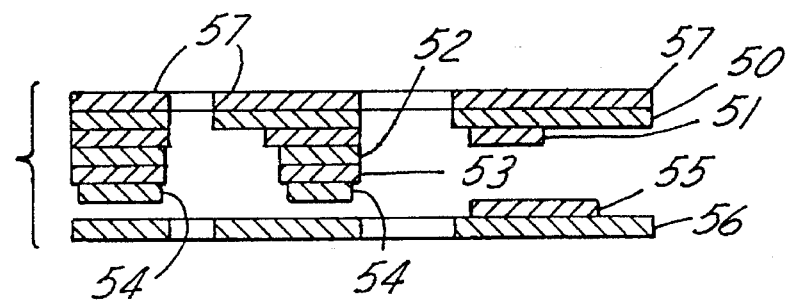
FIG. 5 is a cross-sectional view of the EL lamp panel along lines 513 5 of FIG. 3.

FIG. 5 provides a similar cross-sectional view, but through an area including the translucent fluorescent filter of the present invention. Thus, a clear substrate 50 has deposited thereon a transparent electrode 51, phosphor layer 52, dielectric layer 53, carbon electrode layer 54, silver trace layer 55, and hardcoat layer 56. On the side of lamp panel 21 where electroluminescent light emerges, a translucent fluorescent filter layer 57 is deposited on substrate 50. Fluorescent filter layer 57 includes a fluorescent pigment adapted to absorb light at a frequency emitted by the electroluminescent phosphor layer and to remit visible light at another wavelength for a color which is desired for a particular graphic on the control panel. Preferably, the fluorescent pigment may be applied to substrate 50 in a screen printing process. To facilitate screening, the fluorescent pigment is carried in a substantially clear matrix material adapted to adhere to the material of clear substrate 50. For example, if clear substrate 50 is formed of a polyester, the clear matrix would likewise be based on a polyester material. Any suitable fluorescent pigment may be employed such as fire-orange or arc-yellow as provided by Dayglo Color Corp. Thus, a screenable fluorescent ink may contain about 10 to 33% fluorescent pigment carried in a clear base.

The present invention provides an electroluminescent lamp using a phosphor material that may be optimized for maximum luminance and lamp durability while directly providing a color of light to be utilized for certain backlit graphics on a control panel. Simultaneously, a fluorescent filter alters the spectrum of visible light in certain areas of the lamp in order to increase brightness at a separate distinct color for other graphics on the control panel.

Figure 6:
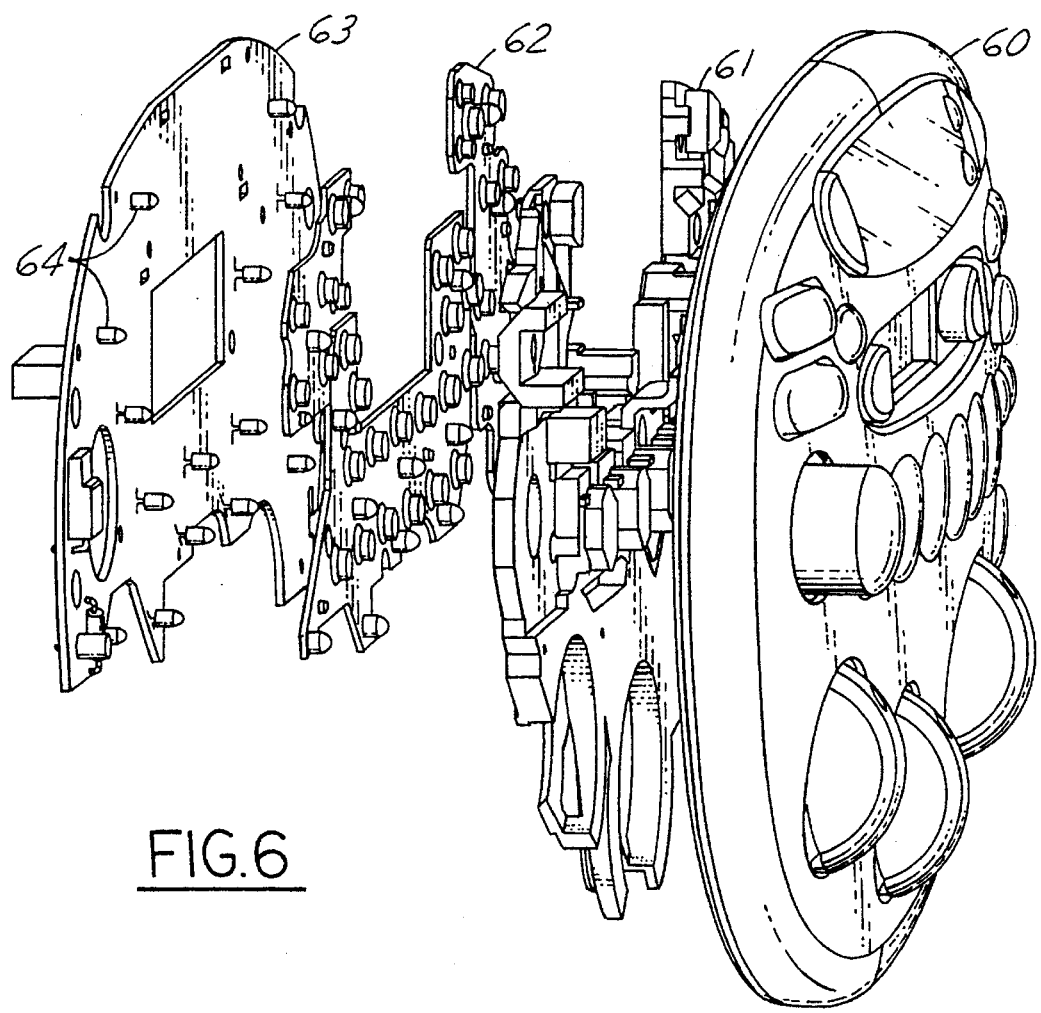
FIG. 6 is an exploded perspective view of an alternative embodiment of the present invention employing incandescent light sources.

An alternative embodiment is shown in FIG. 6. A control bezel 60 is assembled with a light pipe 61, a switchmat/filter 62, and a backplate printed wiring board 63. Backplate 63 includes a plurality of incandescent bulbs 64 which direct illumination through switchmat/filter 62 which filters white light from incandescent bulbs 64 to provide a predetermined color of light for backlighting control panel 60 with a predetermined color of light (e.g., blue-green). The predetermined color of light is distributed to backlit graphics through light pipe 61 as is known in the art.

By combining the switchmat and color filtering functions into one piece, the construction of a control panel is simplified and its total cost is reduced. However, any graphics to be displayed with a color other than the primary color of switchmat/filter 62 may suffer reduced brightness.

Figure 7:
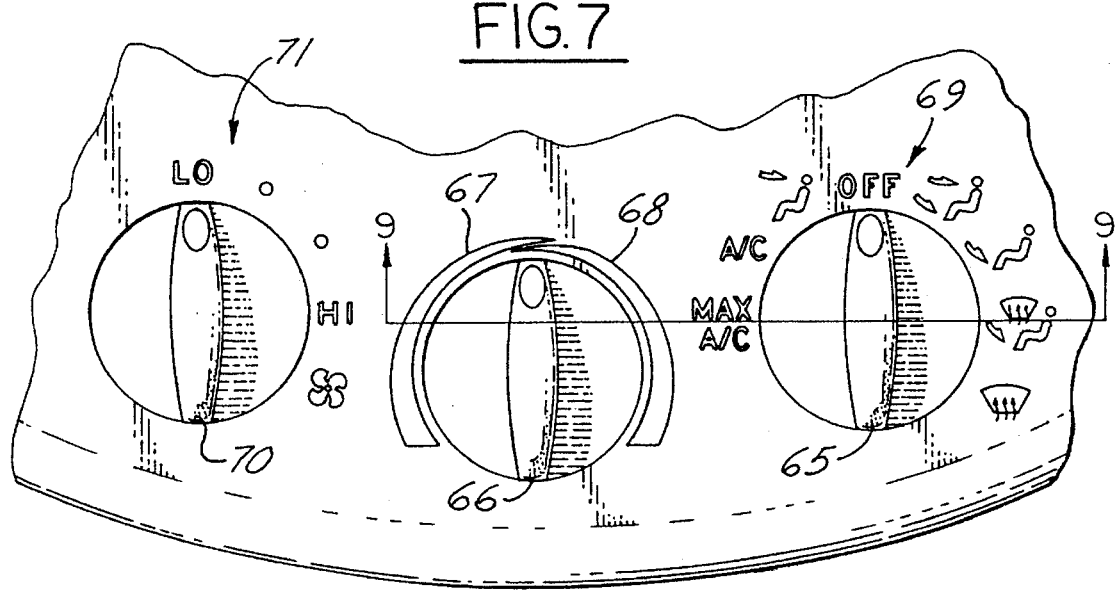
FIG. 7 is a front view of one portion of the bezel of FIG. 6.

Several controls of control panel 60 are shown in FIG. 7. A dial 65 selects from a plurality of climate control functions as shown by backlit graphics 69 surrounding control dial 65. An air temperature is selected by a dial 66 having temperature guides 67 and 68 at the periphery thereof. A fan speed is selected by a dial 70 to obtain a speed indicated by backlit graphics 71. Backlit graphics 69 and 71 are formed of white translucent material so that they show back illumination at the blue-green color of switchmat/filter 62. However, backlit graphic 67 is a translucent blue for suggesting colder temperatures and backlit graphic 68 is formed of a translucent red material to suggest hotter temperatures. During backlighting in a prior art control panel, blue-green light is directed through graphics 67 and 68, resulting in inadequate back illumination for red graphic 68. This problem of the prior art is overcome by employing a translucent fluorescent filter between switch mat/filter 62 and backlit graphic 68.

Figure 8:
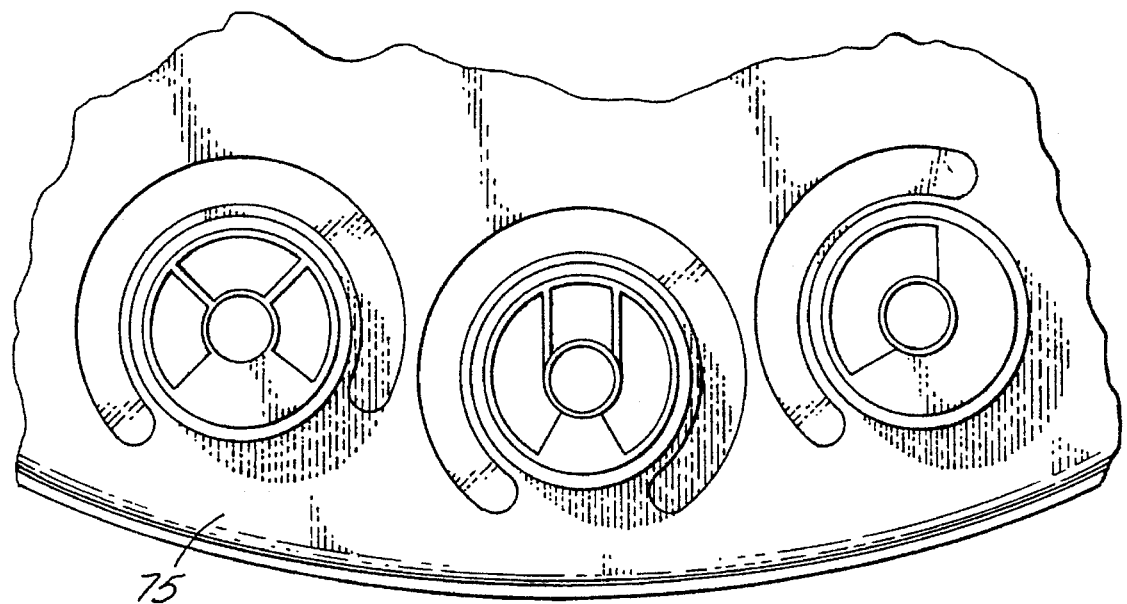
FIG. 8 is a front plan view of a support skeleton corresponding to the bezel portion shown in FIG. 7.

Formation of the translucent fluorescent filter can be done in a simple manner at low cost. A typical bezel for a control panel is comprised of a rigid frame covered by an applique which is molded onto the frame. A structural frame 75 is shown in FIG. 8 prior to molding of the applique thereon. FIG. 8 is a back view of the frame.

Figure 9:
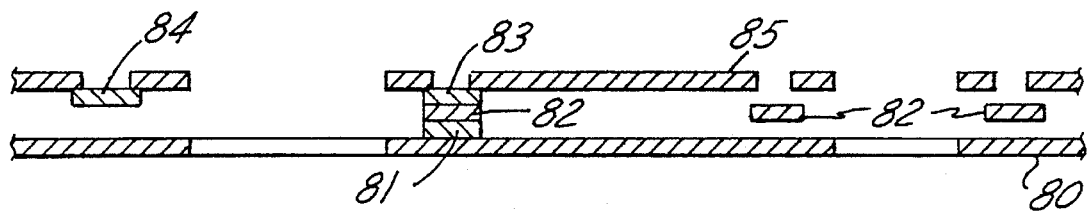
FIG. 9 is a cross-sectional view of an applique that is molded to the support skeleton.

FIG. 9 provides a cross-section of the applique along lines 9—9 of FIG. 7. A clear substrate 80 (comprised of plastic, for example) supports a number of painted layers to create the backlit graphics and opaque areas of the control panel. Preferably, painting is accomplished using a screen printing process.

Fluorescent filter layer 81 is screened on clear substrate 80 in an area corresponding to the red temperature graphic. A white translucent layer 82 provides the white daytime appearance of the other graphics. Next, a colored layer for colored day and night-time graphics is provided. Specifically, a red layer 83 and a blue layer 84 provide the colored temperature graphics. Finally, a black, opaque layer 85 is painted over all areas except those including a backlit translucent graphic. In fact, the openings in the black layer provide the edges of the backlit graphics.

In operation, fluorescent layer 81 converts blue-green light from the switchmat/filter into a red or orange light which then passes through white layer 82 and red layer 83. White layer 82 is provided to mask the orange appearance of fluorescent layer 81 such that it cannot be seen during the daytime.

Figure 10:
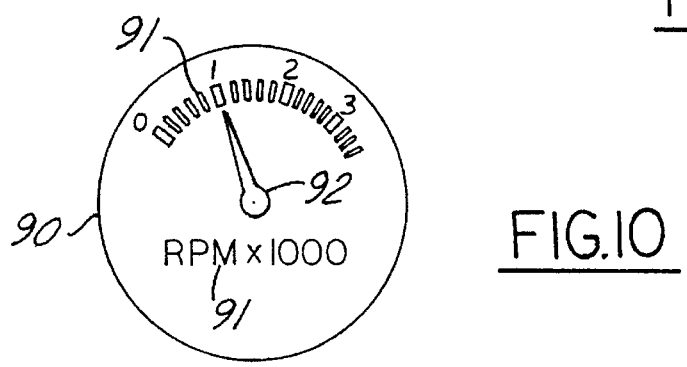
FIG. 10 is a plan view of a display using projected light to illuminate a pointer.

A further embodiment of the present invention utilizes reflected or redirected light. For example, a mechanical gage 90 in FIG. 10 includes illuminated graphics 91 and an illuminated pointer 92. Illuminated pointer 92 shines with a specific color, such as red. In prior art gages, the illuminated pointer 92 is limited in brightness by the red content of the original light source. In order to enhance the brightness, the present invention utilizes a translucent fluorescent filter to increase the visible spectrum at the selected color (e.g., red).

Figure 11:
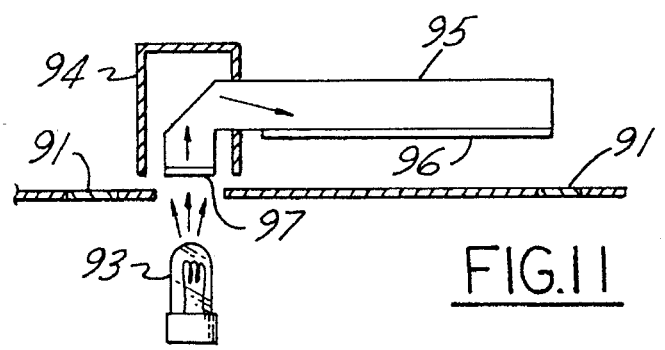
FIG. 11 is a side cross-sectional view along lines 11—11 of FIG. 10.

As shown in the cross-sectional view of FIG. 11, graphics 91 are back illuminated by an incandescent light source 93. Illuminated pointer 92 includes a hub 94 and an indicator arm 95 suspended for rotation by a mechanism not shown. In the prior art, light entering arm 95 from incandescent source 93 is internally reflected to illuminate a painted layer 96 on the bottom side of arm 95. This painted layer provides the color (e.g., red) of arm 95 which is formed of a clear plastic. According to the present invention, a translucent fluorescent filter layer 97 is painted on one end surface of arm 95 where light enters the arm. The fluorescent filter enhances the red content of the light spectrum illuminating colored layer 96. Thus, a light path exists from the incandescent source to the colored layer in the indicator arm. A translucent fluorescent filter is disposed in the light path to modify the visible spectrum of light illuminating the illuminated arm display element to provide greater luminance at the predetermined color desired. Only the light redirected by arm 95 to colored layer 96 has its visible spectrum modified. Illumination of the other graphics is unchanged.

What is claimed is:

1. An automotive illumination apparatus comprising:
    a backlit display panel having first and second translucent graphics, said first translucent graphic being displayed with a first predetermined color, said second translucent graphic being displayed with a second predetermined color corresponding to a higher frequency than said first predetermined color;
    a light source backlighting said backlit display panel and directing illumination toward said first translucent graphic and said second translucent graphic, said light source having a luminance at said first predetermined color less than a desired total luminance to be provided by said first translucent graphic; and
    a layer of fluorescent material disposed between said light source and said first translucent graphic, said fluorescent material characterized by light absorption at said second predetermined color and light re-emission including said first predetermined color.

2. The apparatus of claim 1 wherein said light source is comprised of an electroluminescent lamp.

3. The apparatus of claim 1 wherein said light source is comprised of filtered incandescent light.

4. The apparatus of claim 1 wherein said layer of fluorescent material comprises a fluorescent pigment.

5. The apparatus of claim 4 wherein said fluorescent pigment is carried in a substantially clear matrix.

6. The apparatus of claim 2 wherein said layer of fluorescent material comprises a fluorescent pigment screened on said electroluminescent lamp.

7. The apparatus of claim 3 wherein said layer of fluorescent material comprises a fluorescent pigment screened on said backlit display panel.

8. Apparatus comprising:
    a backlit display panel having first and second translucent graphics, said first translucent graphic being displayed with a first predetermined color, said second translucent graphic being displayed with a second predetermined color;

an electroluminescent lamp in the form of a thin sheet having a first light emitting area disposed behind and illuminating said first translucent graphic and a second light emitting area disposed behind and illuminating said second translucent graphic, said first and second light emitting areas emitting substantially identical light having an intrinsic color corresponding to a higher frequency than said first predetermined color; and a layer of fluorescent material disposed between said first light emitting area and said first translucent graphic, said fluorescent material characterized by light absorption at said intrinsic color and light re-emission including said first predetermined color.

9. The apparatus of claim 8 wherein said layer of fluorescent material is comprised of a fluorescent pigment carried in a substantially clear matrix.

10. The apparatus of claim 9 wherein said layer of fluorescent material is applied to said electroluminescent lamp in a screening process to selectively cover said first light emitting area.

11. An automotive illumination apparatus comprising:

a backlit display panel having first and second translucent graphics, said first translucent graphic being displayed with a first predetermined color, said second translucent graphic being displayed with a second predetermined color corresponding to a higher frequency than said first predetermined color;

a substantially white light source backlighting said backlit display panel and directing illumination toward said first translucent graphic and said second translucent graphic;

a light filter disposed between said backlit display panel and said substantially white light source, said light filter substantially blocking all light in said substantially white light source other than said second predetermined color whereby light directed through said light filter toward said first translucent graphic has a luminance at said first predetermined color less than a desired total luminance to be provided by said first translucent graphic; and a layer of fluorescent material disposed between said light filter and said first translucent graphic, said fluorescent material characterized by light absorption at said second predetermined color and light re-emission including said first predetermined color.

12. The apparatus of claim 11 wherein said first translucent graphic has the color of said first predetermined color.

13. The apparatus of claim 11 wherein said second translucent graphic is substantially white in color.

14. The apparatus of claim 11 wherein said backlit display panel is comprised of an applique, said applique including a substantially clear substrate having said layer of fluorescent material, said first and second translucent graphics, and an opaque background disposed thereon.

15. The apparatus of claim 14 further comprising a substantially white translucent layer disposed on said applique between said layer of fluorescent material and said first translucent graphic.

* * * * *